(12) United States Patent
Hagerty et al.

(10) Patent No.: US 12,464,450 B2
(45) Date of Patent: Nov. 4, 2025

(54) METHODS, SYSTEMS, AND DEVICES FOR DYNAMICALLY SELECTING A NETWORK ASSOCIATED WITH AN ACCESS POINT NAME (APN) ON A COMMUNICATION DEVICE BASED ON PARAMETER(S)

(71) Applicant: AT&T Mobility II LLC, Atlanta, GA (US)

(72) Inventors: Teresa Hagerty, Seattle, WA (US); Suzanne Richards, Huntersville, NC (US); Bart Harrison, Verona, WI (US)

(73) Assignee: AT&T Mobility II LLC, Atlanta, GA (US)

( * ) Notice: Subject to any disclaimer, the term of this patent is extended or adjusted under 35 U.S.C. 154(b) by 437 days.

(21) Appl. No.: 17/973,751

(22) Filed: Oct. 26, 2022

(65) Prior Publication Data

US 2024/0147357 A1 May 2, 2024

(51) Int. Cl.
*H04W 48/20* (2009.01)
*H04W 48/16* (2009.01)
*H04W 48/18* (2009.01)
*H04W 76/10* (2018.01)

(52) U.S. Cl.
CPC ........... *H04W 48/20* (2013.01); *H04W 48/16* (2013.01); *H04W 48/18* (2013.01); *H04W 76/10* (2018.02)

(58) Field of Classification Search
CPC ..... H04W 48/20; H04W 48/16; H04W 48/18; H04W 76/10
See application file for complete search history.

(56) References Cited

U.S. PATENT DOCUMENTS 10,405,193 B1 * 9/2019 Cui ................... H04W 16/10

* cited by examiner

*Primary Examiner* — Diane D Mizrahi
(74) *Attorney, Agent, or Firm* — Guntin & Gust, PLC; Erik Boyd

(57) ABSTRACT

Aspects of the subject disclosure may include, for example, initiating a data request over a mobile network, and identifying a group of parameters associated with the data request. Further embodiments include selecting a first active network associated with a first active access point name (APN) (or data network name (DNN) from a group of networks based on the group of parameters, and the mobile network comprises the group of networks. Additional embodiments include identifying a first access point for the first active network associated with the first active APN/DNN, and establishing a first data communication session associated with the data request to a first group of communication devices communicatively coupled to the first active network via the first access point. Other embodiments are disclosed.

20 Claims, 12 Drawing Sheets

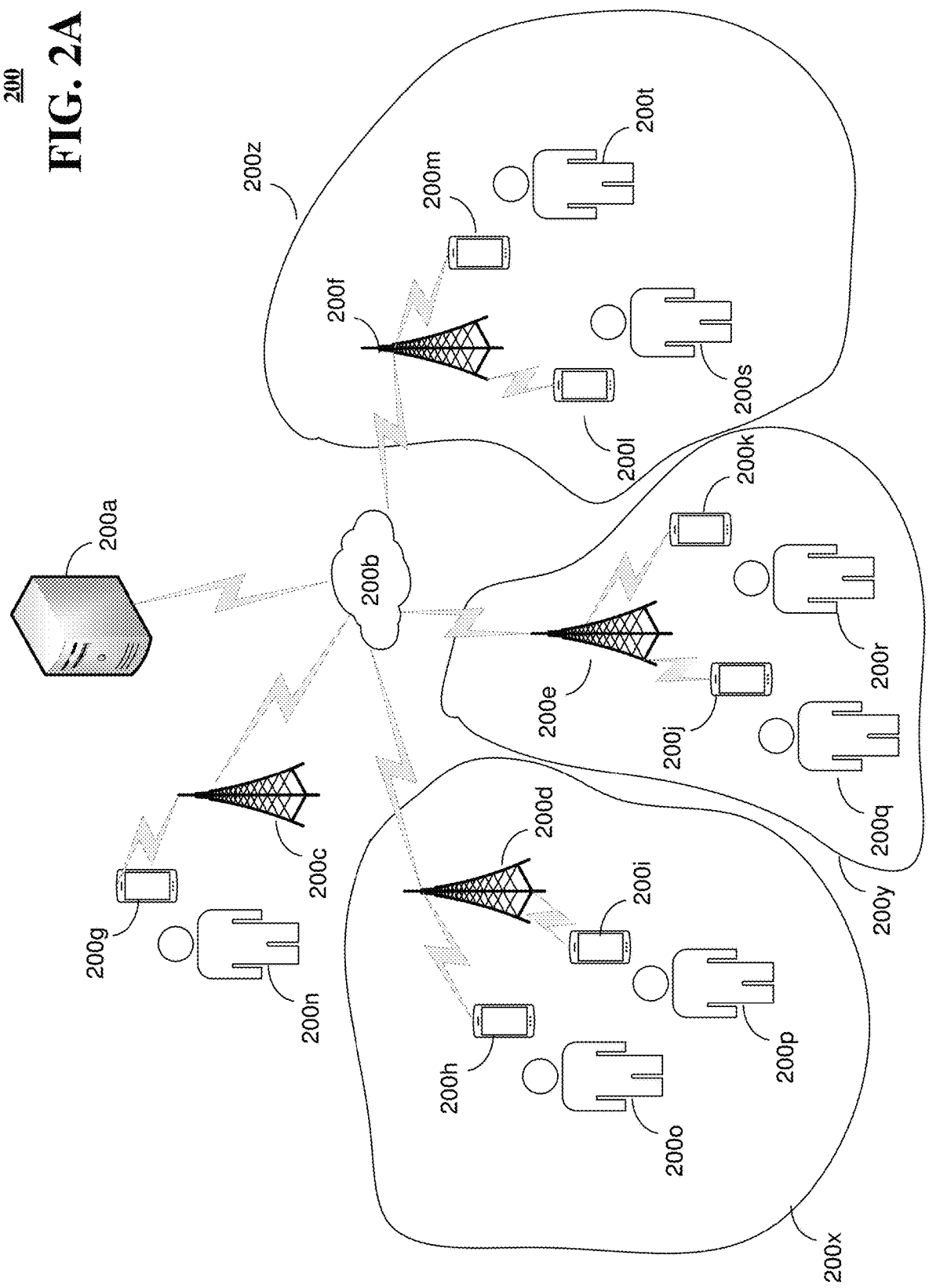

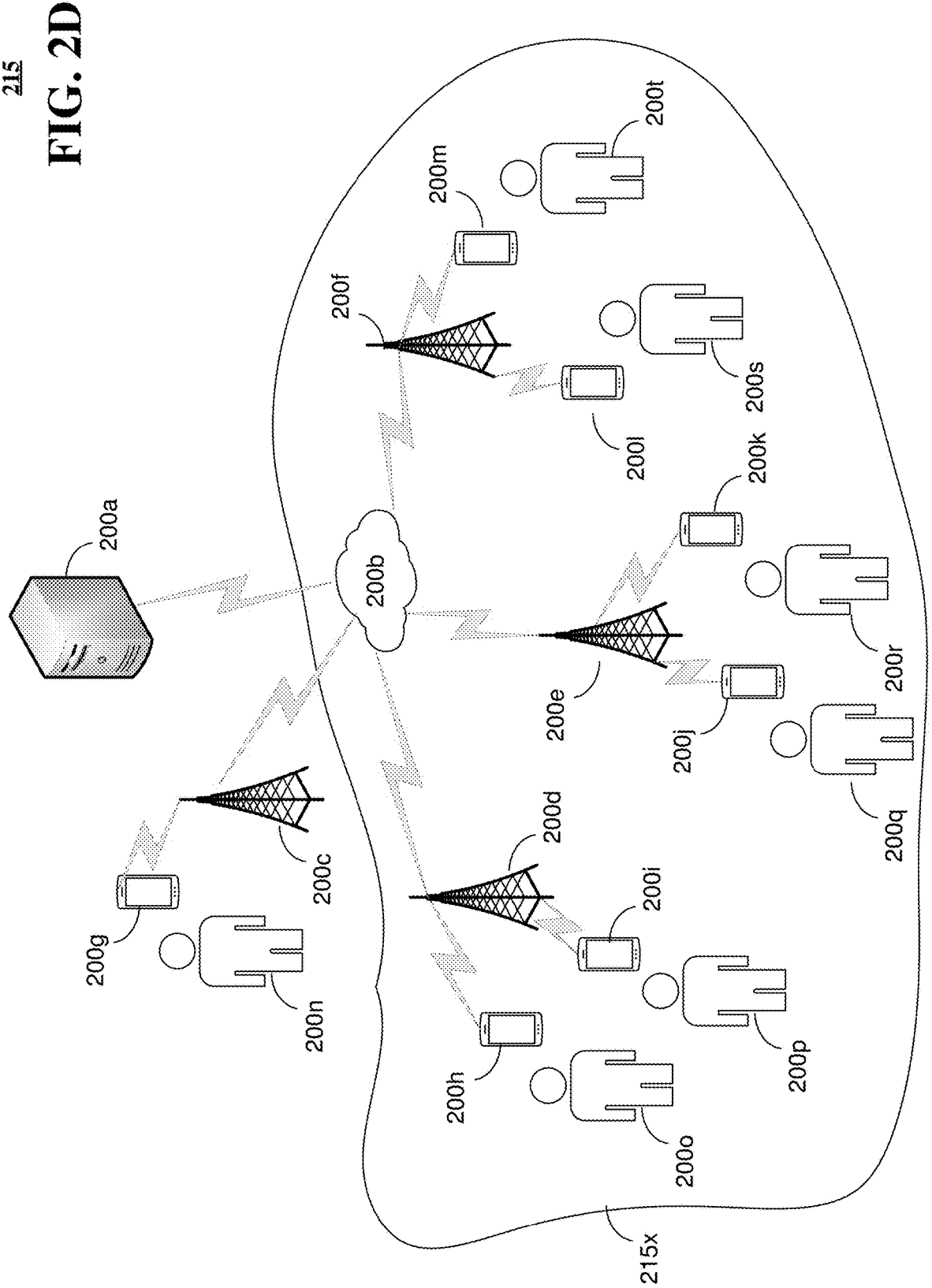

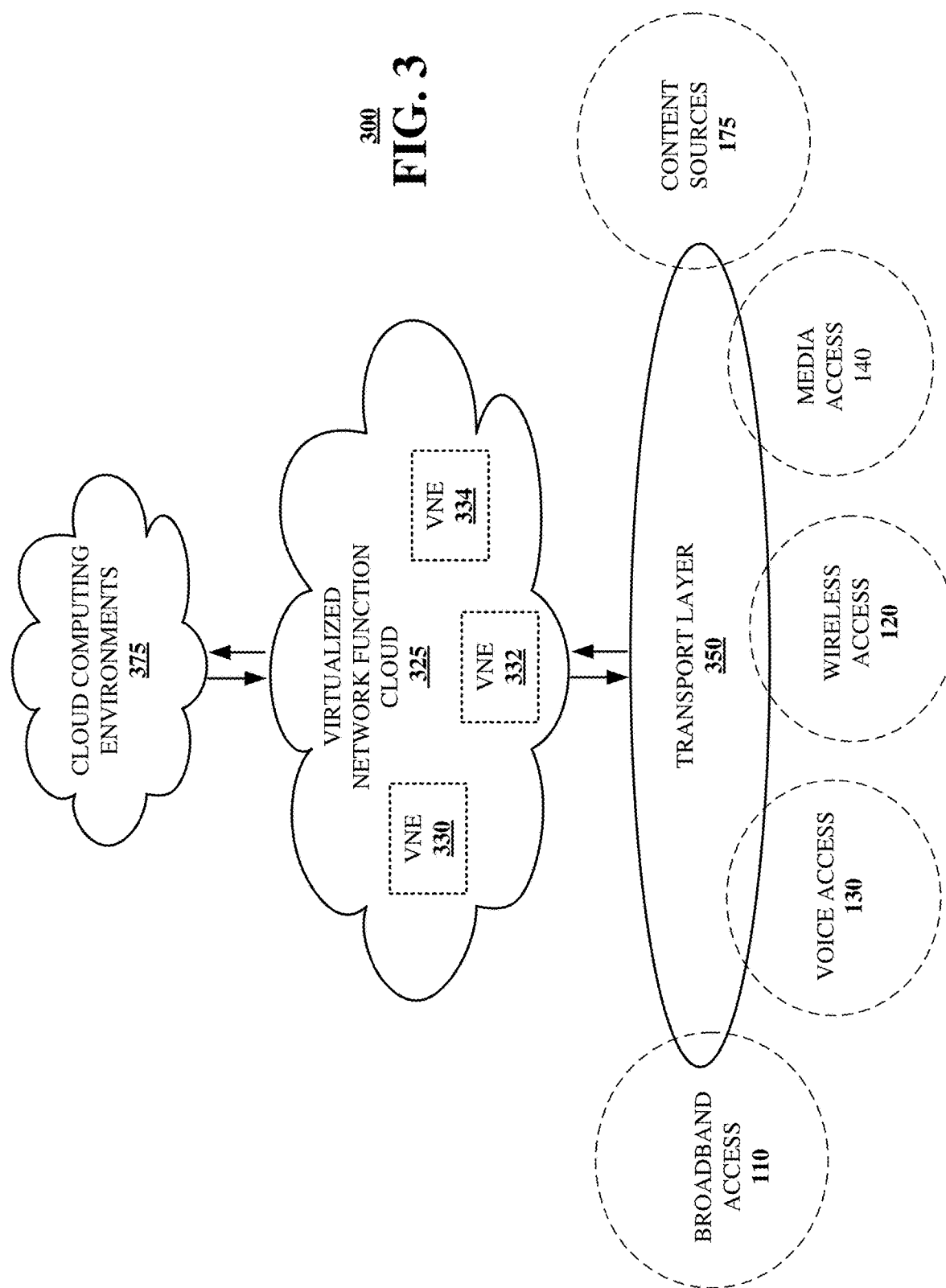

600

METHODS, SYSTEMS, AND DEVICES FOR DYNAMICALLY SELECTING A NETWORK ASSOCIATED WITH AN ACCESS POINT NAME (APN) ON A COMMUNICATION DEVICE BASED ON PARAMETER(S)

FIELD OF THE DISCLOSURE

The subject disclosure relates to methods, systems, and devices for dynamically selecting a network associated with an access point name (APN) on a communication device based on parameter(s).

BACKGROUND

A mobile phone attempts to connect to a carrier network based on its configured access point name (APN) setting. In the current state of the art, this setting is currently controlled by the designation or manual user-driven selection of a single default APN at a time. This limits the ability for a user of the mobile phone to switch from one carrier network to another, increases the complexity of carrier network setting management, and negatively impacts the customer experience. Further, the current state of the art does not select an APN or data network name (DNN) carrier network settings based on geographic location(s), network conditions, network end-point destinations, IP addressing, or customer specific business rules, which can impact the service provided to the mobile phone. (Note, the term APN and DNN can be used interchangeably. Further, embodiments that utilize an APN can also utilize a DNN)

BRIEF DESCRIPTION OF THE DRAWINGS

Reference will now be made to the accompanying drawings, which are not necessarily drawn to scale, and wherein:

FIGS. 2A-2F are block diagrams illustrating example, non-limiting embodiments of systems functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
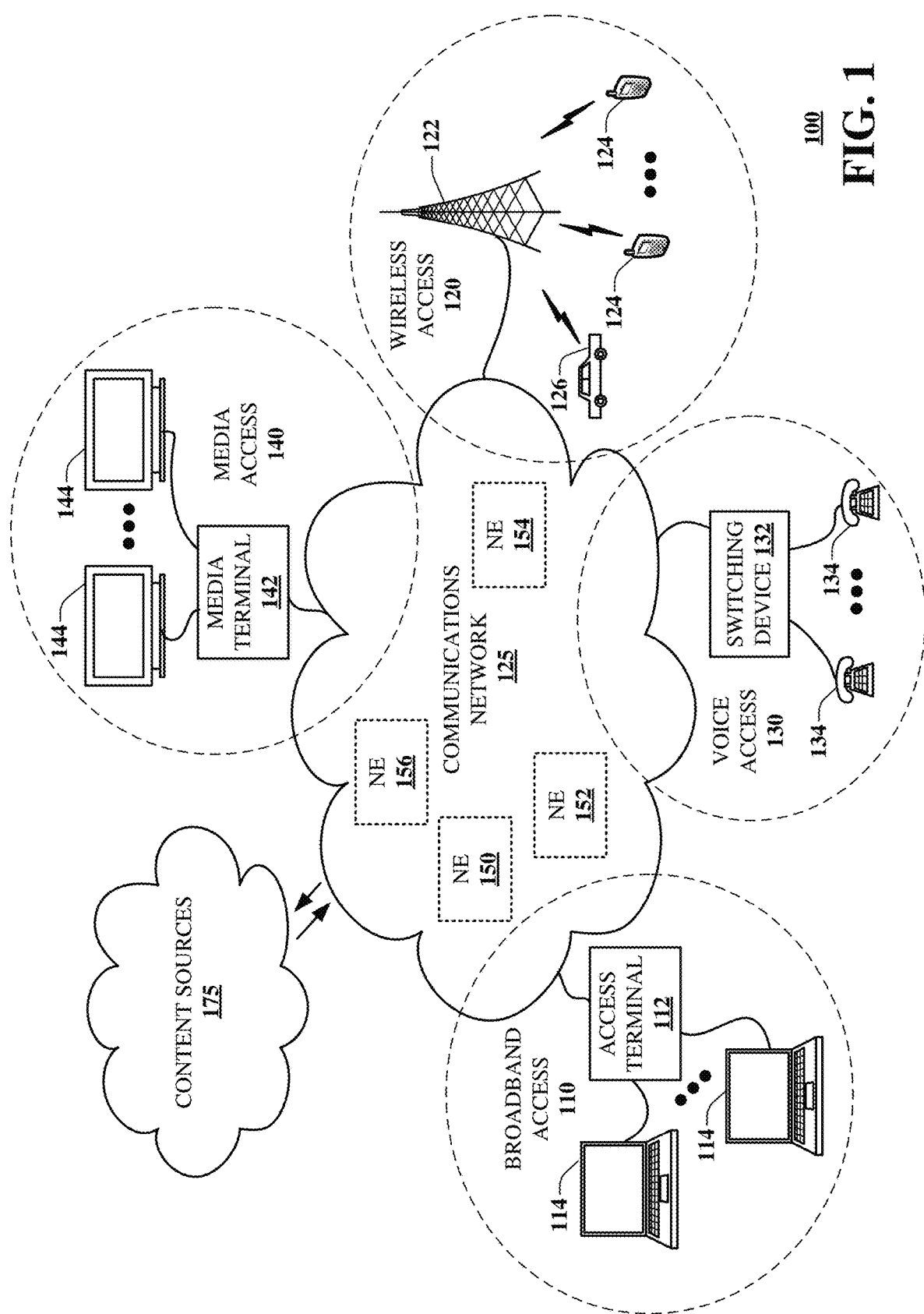
FIG. 1 is a block diagram illustrating an exemplary, non-limiting embodiment of a communications network in accordance with various aspects described herein.

The subject disclosure describes, among other things, illustrative embodiments for initiating a data request over a mobile network, and identifying a group of parameters associated with the data request. Further embodiments can include selecting a first active network associated with a first active access point name (APN) from a group of networks based on the group of parameters, and the mobile network comprises the group of networks. (Note, the term APN and DNN can be used interchangeably. Further, embodiments that utilize an APN can also utilize a DNN). Additional embodiments can include identifying a first access point for the first active network associated with the first active APN/DNN, and establishing a first data communication session associated with the data request to a first group of communication devices communicatively coupled to the first active network via the first access point. Other embodiments are described in the subject disclosure.

One or more aspects of the subject disclosure include a communication device, comprising a processing system including a processor and a memory that stores executable instructions that, when executed by the processing system, facilitate performance of operations. Operations can comprise initiating a data request over a mobile network, and identifying a group of parameters associated with the data request. Further operations can comprise selecting a first active network associated with a first active access point name (APN)/data network name (DNN) from a group of networks based on the group of parameters, and the mobile network comprises the group of networks. Additional operations can comprise identifying a first access point for the first active network associated with the first active APN/DNN, and establishing a first data communication session associated with the data request to a first group of communication devices via the first access point.

One or more aspects of the subject disclosure include a non-transitory, machine-readable medium, comprising executable instructions that, when executed by a processing system including a processor, facilitate performance of operations. The operations can comprise initiating a data request over a mobile network, identifying a group of parameters associated with the data request, and determining a group of networks based on the group of parameters. Further operations can comprise ranking the group of networks based on the group of parameters based on the group of parameters, and the mobile network comprises the group of networks. Additional operations can comprise selecting a first active network associated with a first active access point name (APN) or data network name (DNN) from the group of networks based on the group of parameters and according to the ranking of the group of network. The first active network has a highest ranking of the ranking of the group of networks. Also, the operations can comprise identifying a first access point for the first active network associated with the first active APN/DNN, and establishing a first data communication session associated with the data request to a first group of communication devices communicatively coupled to the first active network via the first access point.

One or more aspects of the subject disclosure include a method. The method can comprise initiating, by a processing system including a processor, a data request over a mobile network, identifying, by the processing system, a group of parameters associated with the data request, and identifying, by the processing system, an allocation of a network slice for the data request based on the group of parameters. Further, the method can comprise identifying, by the processing system, a network associated with an access point name (APN) or data network name (DNN) associated with the network slice, and the mobile network comprises the network. In addition, the method can comprise identifying, by the processing system, an access point associated with the network. The access point is associated with the APN/DNN. Also, the method can comprise establishing, by the processing system, a data communication session associated with the data request to a group of communication devices communicatively coupled to the network via the access point.

Referring now to FIG. 1, a block diagram is shown illustrating an example, non-limiting embodiment of a system 100 in accordance with various aspects described herein. For example, system 100 can facilitate in whole or in part a communication device dynamically selecting a network associated with an APN/DNN based on a group of parameters. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2F are block diagrams illustrating example, non-limiting embodiments of systems functioning within the communication network of FIG. 1 in accordance with various aspects described herein.

One or more embodiments expand the carrier network selection functionality on communication devices. Some embodiments support the selection of only one fixed default APN or Data Network Name (DNN) at a time. (Note, the term APN and DNN can be used interchangeably. Further, embodiments that utilize an APN can also utilize a DNN). Other embodiments can rely on more than one APN/DNN carrier settings on a wider population of communication devices. The selection of APN/DNN carrier network settings may be based on geographic location(s), network conditions, network end-point destinations, IP addressing, network slicing, or customer specific business rules. Further embodiments enable communication devices to dynamically select the best available APN/DNN, based on user or carrier operator defined preferences or parameters, for the data session or request.

One or more embodiments rely on an expansion of communication device analysis and carrier network awareness and selection behavior to select a network associated with an APN/DNN. Further embodiments enable the communication device to maintain a list of key attributes and current network conditions for each available APN/DNN configured on the communication device. The communication device can analyze each data request or data communication session to match the desired request endpoint, network quality baselines, network slice requirements, security requirement, and other business rules and/or parameters to the best currently available APN/DNN carrier network connection. One of more APN/DNNs may also be designated as a default, fallback APN/DNNs selection, based on order of preference(s) or parameters, in the event of unavailability of the initial preferred APN/DNN. The benefits of the embodiments described herein include reduced administrative and user impact device management overhead, avoidance of outage experiences caused by unavailable/incorrect APN/DNN settings, and improved user experience.

Referring to FIG. 2A, in one or more embodiments, system 200 comprises a network management device 200a communicatively coupled to communication network 200b. Further, communication device 200g associated with user 200n is communicatively coupled to communication network 200b via base station 200c. In addition, communication device 200h associated with user 200o and communication device 200i associated with user 200p are communicatively coupled to communication network 200b via base station 200d. Also, communication device 200j associated with user 200q and communication device 200k associated with user 200r are communicatively coupled to communication network 200b via base station 200e. Further, communication device 200l associated with user 200s and communication device 200m associated with user 200t are communicatively coupled to communication network 200b via base station 200f.

In one or more embodiments, communication device 200h and communication device 200i can be associated with a network 200x associated with an APN/DNN. Further, communication device 200j and communication device 200k can be associated with a network 200y associated with another APN/DNN. In addition, communication device 200l and communication device 200m can be associated with a network 200z associated with still another APN/DNN. Each of communication device 200g, communication device 200h, communication device 200i, communication device 200j, communication device 200k, communication device 200l, and communication device 200m can comprise a mobile phone, smartphone, mobile device, tablet computer, smartwatch, wearable device, virtual reality device, augmented reality device, cross reality device, or any other communication device communicatively coupled to communication network 200b. Further, communication network 200b can include a mobile network comprising a wireless communication network, a wired communication network, or a combination thereof. A network management device 200a can comprise one or more servers located in one or more locations, one or more virtual servers, located in one or more locations, one or more cloud servers, etc.

In one or more embodiments, communication device 200g can initiate a data request over communication network 200b and would like to be communicatively to a network associated with an APN/DNN based on a group of parameters. Network management device 200a can facilitate communicatively coupling communication device 200g to an APN/DNN based on the group of parameters. Further, the communication device can identify the group of parameters associated with the data request. The group of parameters can comprise geographic parameters, IP address parameters, end point parameters, network type parameters, network QoS parameters, network conditions parameters, or network slice parameters. That is, a geographic parameter can include the current location of communication device 200g and/or the geographic area associated with any selected network of an APN/DNN. An IP address parameter can include the destination IP address of an end point communication device associated with the data request and selecting a network of an IP that includes the end point communication device associated with the destination IP address. An end point parameter can be any parameter associated with an end point communication device such as a communication device type and selecting a network of an APN/DNN that includes a communication device with the communication device type. A network type parameter can include whether the network type of the network associated with the APN/DNN is of a particular type of mobile network (e.g., LTE, 5G, etc.). A network QoS parameter can include a latency parameter, throughput parameter, bitrate parameter, etc. associated with the network of the APN/DNN. A network conditions parameter can include the signal to noise ratio (SNR), bandwidth, etc. associated with data communication sessions of a network associated with an APN/DNN. A network slice parameter can include identifying a particular network slice associated with a network of an APN/DNN.

In one or more embodiments, the communication device 200g can select a network 200x, network 200y, or network 200z associated with different APNs/DNNs based on the group of parameters. This selection can be based on a network conditions parameter satisfying a threshold (e.g., available bandwidth satisfies a threshold), a geographic parameter satisfies a distance threshold (e.g., all communication devices associated with the network are within a distance threshold), etc. Further, the communication device 200g can identify an access point (e.g., base station 200d, base station 200e, base station 2000 associated with the network of the APN/DNN. After selecting the network associated with the APN/DNN, communication device 200g can establish a data communication session with a one or more communication devices communicatively coupled to the network of the APN/DNN via the access point.

In one or more embodiments, the communication device 200g can determine a group of networks based on the group of parameters, each network associated with a different APN/DNN. Further, the communication device 200g can rank each of the group of networks according to the group of parameters (e.g., one or more parameters satisfying a respective threshold or matching a criteria such as device type=5G) and the communication device 200g selects the network from the group of networks ranked highest (e.g., first ranking). In some embodiments, the communication device 200g can select a default network associated with an APN/DNN. If no other network can be selected based on the group of parameters (e.g., none of the parameters satisfy their respective thresholds), or other preferred APN/DNN networks are unavailable, then the communication device 200g selects the default network of the default APN/DNN to initiate a data communication session associated with the data request.

Figure 2B:
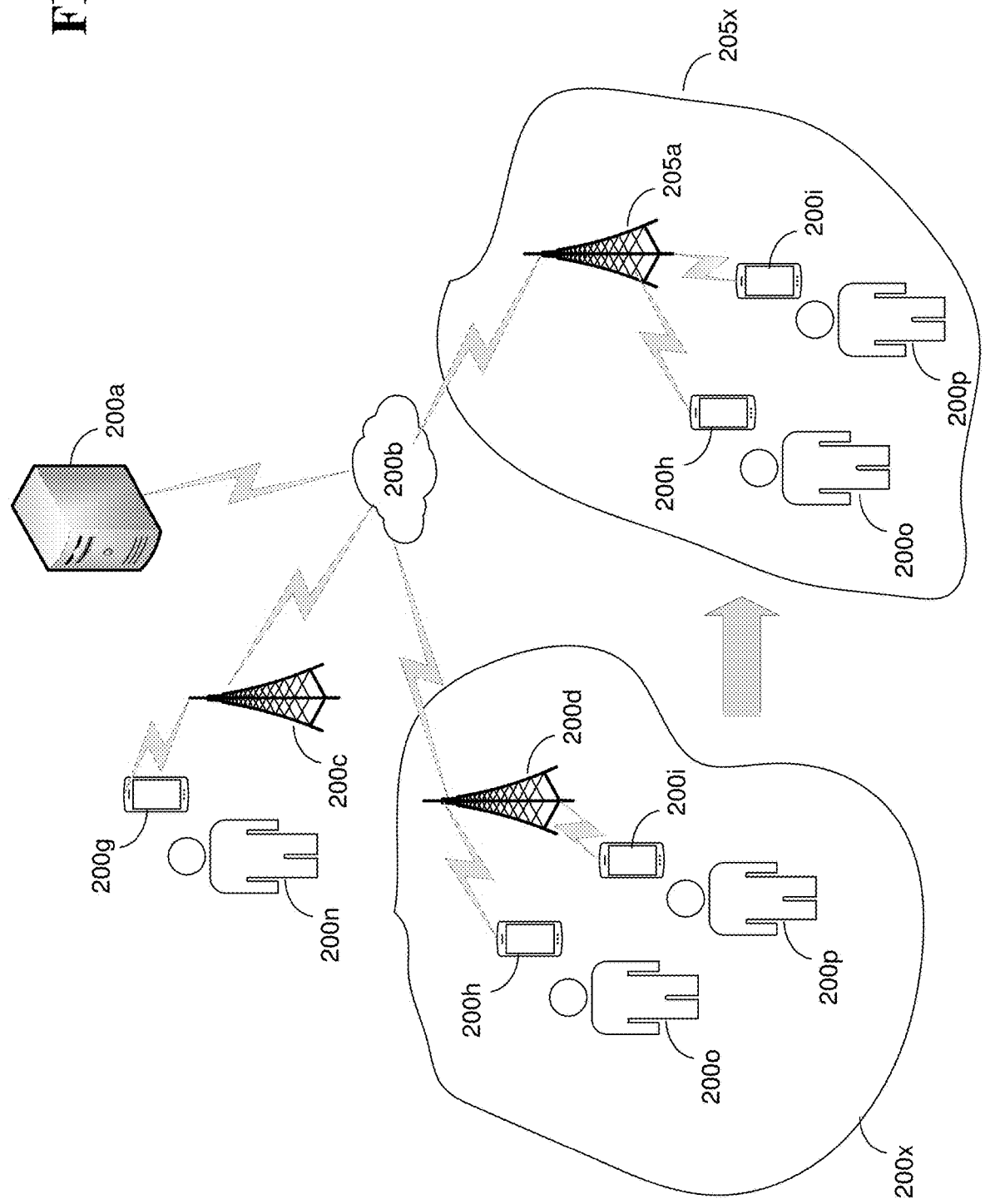

Referring to FIG. 2B, in one or more embodiments, a system 205 can include a communication device 200g initiating a data request and selects a network 200x of an APN/DNN for the data communication session for the data request based on a group of parameters. However, after the communication device 200g communicatively couples to network 200x, the congestion or some other network condition (e.g., available bandwidth, latency, throughput, etc.) exceeds a threshold. In response, the network management device 200a can facilitate communication device 200h and communication device 200i to transition to network 205x such that if communication device 200h and communication device 200i in addition to communication device 200g communicatively couples to network 205x, then the congestion and/or network conditions associated with network 205x satisfy respective thresholds. Further, the network management device 200a can provide the APN/DNN associated with the network 205x to communication device 200g so that communication device 200g can select network 205x and initiate a data communication session via base station 205a (e.g., access point) to either communication device 200h and/or communication device 200i.

Figure 2C:
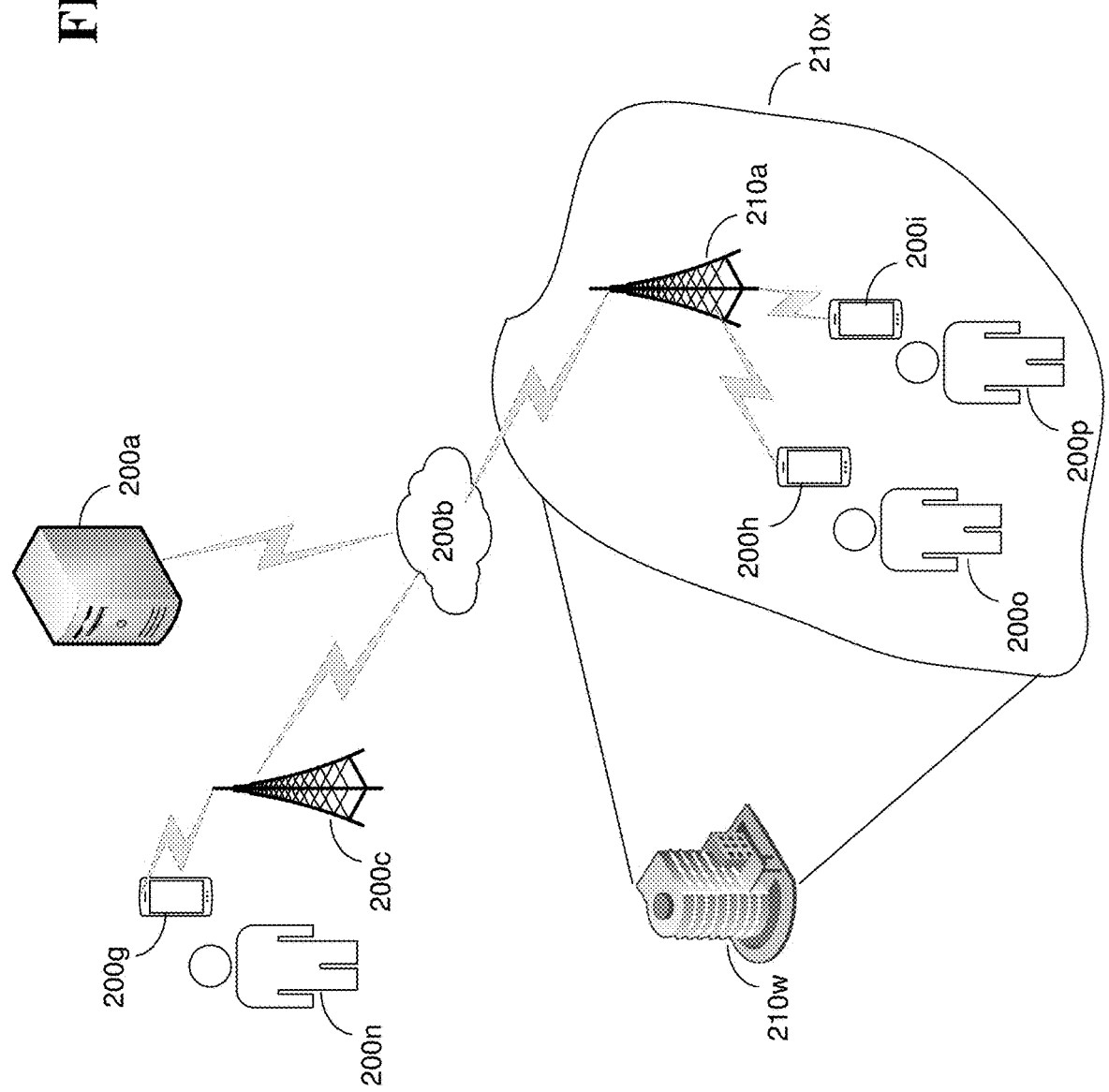

Referring to FIG. 2C, in one or more embodiments, system 210 can comprise a network 210x associated with an APN/DNN with base station 210a (access point). Further, network 210x can be associated with a network slice of the mobile network associated with communication network 200b. In addition, the network slice can be associated with a geographic area such as hotel 210w in which a trade conference is taking place and the network slice is for communication devices of users participating in the trade conference. Thus, the network management device 200a can provide the APN/DNN of network 210x to communication device 200g so that communication device 200g can select network 210x for a data communication session initiated by a data request by communication device 200g. Further, the network slice can be allocated by the mobile network operator of communication network 200b for a limited time period (e.g., the time period associated with the trade conference).

Referring to FIG. 2D, in one or more embodiments, system 215 can comprise network 215x associated with an APN/DNN in which each of communication device 200h, communication device 200i, communication device 200j, communication device 200k, communication device 200l, and communication device 200m are communicatively coupled to network 215x because each of the communication devices implement the same software application or service (e.g., video gaming application or service). Further, if communication device 200g utilizing the same application or service, then the communication device 200g can select the APN/DNN of network 215x, accordingly.

Figure 2E:
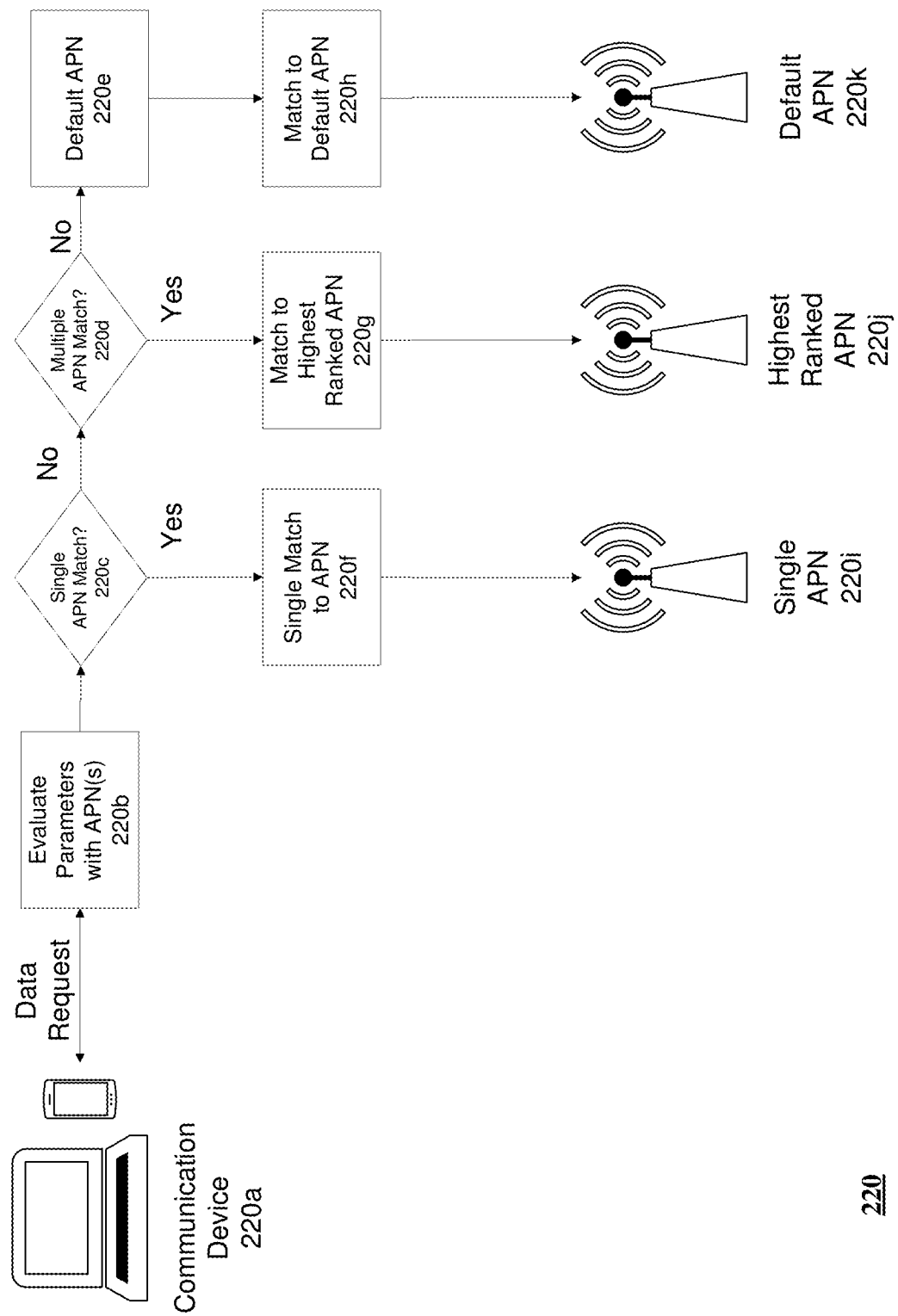

Referring to FIG. 2E, one or more embodiments can include a system 220. Further, the system 220 can include a communication device 220a initiating a data request and evaluating parameters associated with communication device 220a and/or the network associated with APN(s)/DNN(s) to select a particular network. The communication device 220a determines whether there is a single match to an APN/DNN when evaluating the parameters. If so, the communication device identifies the single match to the APN/DNN 220f and establishes a data communication session via access point 220i to the network associated with 220f. If not, the communication device 220a determines whether there are multiple APNs/DNNs that match when evaluating the parameters. If so, the communication device 220a ranks the multiple APNs/DNNs and matches to the highest ranked APN/DNN 220g and establishes a data communication session via access point 220j to the network associated with APN/DNN 220g. If not or no other networks with APNs/DNNs are available, then the communication device 220a identifies a default APN/DNN, matches the default APN/DNN 220h and establishes a data communication session via access point 220k to a network associated with the default APN/DNN 220h.

Figure 2F:
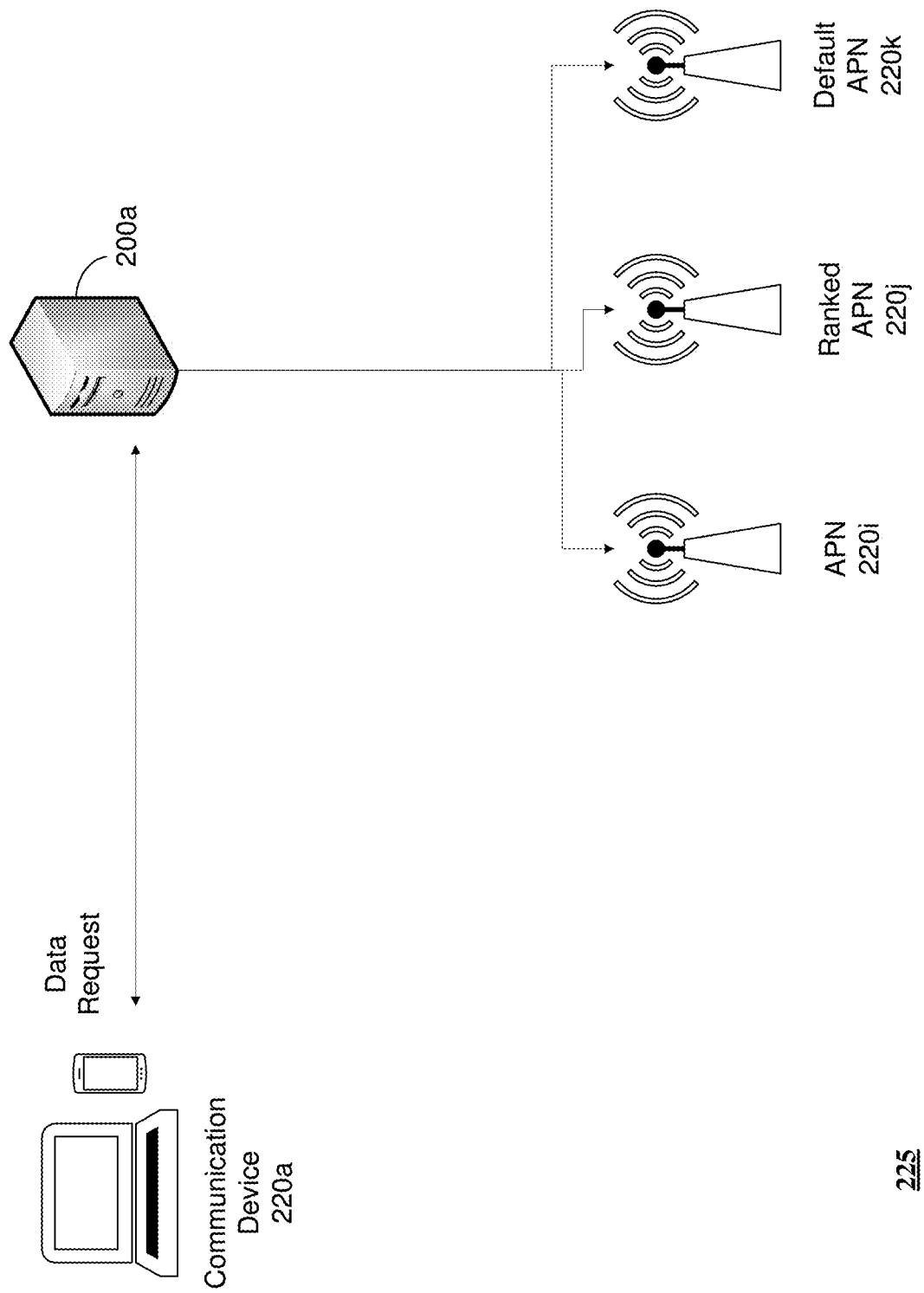

Referring to FIG. 2F, one or more embodiments can include a system 225. Further, system 225 can include network management device 200a that facilitates establishing a data communication session associated with data request between communication device 220a to access point 220i, access point 220j, or access point 220k according to their respective APNs/DNNs according to FIG. 2G.

Figure 2G:
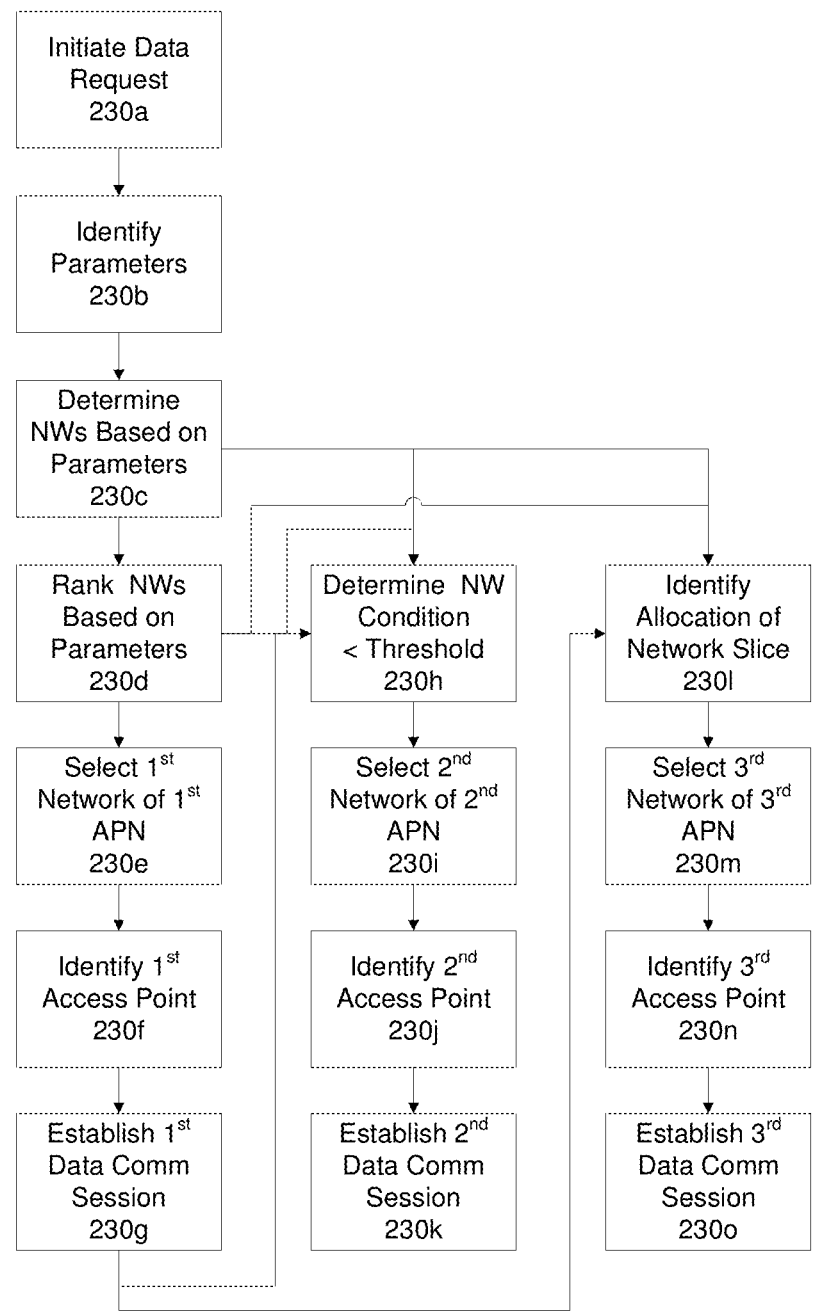
FIG. 2G depicts an illustrative embodiment of a method in accordance with various aspects described herein.

FIG. 2G depicts an illustrative embodiment of a method 230 in accordance with various aspects described herein. Aspects of method 230 can be implemented by a communication device. The method 230 can include the communication device, at 230a, initiating a data request over a mobile network. Further, the method 230 can include the communication device, at 230b, identifying a group of parameters associated with the data request. The group of parameters can include geographic parameters, IP address parameters, end point parameters, network type parameters, network QoS parameters, network conditions parameters, or network slice parameters. In addition, the method 230 can include the communication device, at 230c, determining the group of networks based on the group of parameters. Also, the method 230 can include the communication device, at 230d, ranking the group of networks based on the group of parameters. Further, the method 230 can include the communication device, at 230e, selecting a first active network associated with a first active access point name (APN) (or DNN) from a group of networks based on the group of parameters and/or having a highest ranking. In some embodiments, the mobile network can comprise the group of networks. In other embodiments, several mobile network operated by different carriers can comprise the group of networks. In addition, the method 230 can include the communication device, at 230f, identifying a first active access point for the first active network associated with the first active APN/DNN. Also, the method 230 can include the communication device, at 230g, establishing a first data communication session associated with the data request to a first group of communication device via the first access point. The data communication session can comprise a communication session associated with an application (e.g., messaging application, video game application, etc.), viewing video content, video conferencing, voice call, etc. In some embodiments, the communication device can identify the first active network as a default network based on the group of parameters and cannot communicatively couple to another, more preferred network associated with another APN/DNN based on the group of parameters.

In one or more embodiments, the method 230 can include the communication device, at 230h, determining a network condition associated with the first active network does not satisfy a threshold resulting in a first determination. Further, the method 230 can include the communication device, at 230i, selecting a second active network associated with a second active APN/DNN from the group of networks based on the group of parameters and the first determination. In addition, the method 230 can include the communication device, at 230j, identifying a second access point for the second active network associated with the second active APN/DNN. Also, the method 230 can include the communication device, at 230k, establishing a second data communication session associated with the data request to a second group of communication devices via the second access point. In some embodiments, a portion of the first group of communication devices can comprises a portion of the second group of communication devices.

In one or more embodiments, the method 230 can include the communication device, at 230l, identifying an allocation of a network slice for the data request. Further, the method 230 can include the communication device, at 230m, identifying a third active network associated with a third active APN/DNN associated with the network slice. In addition, the method 230 can include the communication device, at 230n, identifying a third access point associated with the third active network. The third access point is associated with the third active APN/DNN. Also, the method 230 can include the communication device, at 230o, establishing a third data communication session associated with the data request to a third group of communication devices communicatively coupled to the third active network via the third access point to a communication device communicatively coupled to the third active network. A portion of the first group of communication devices comprise a portion of the third group of communication devices. In some embodiments, the allocation of the network slice is associated with a time period. In other embodiments, the allocation of the network slice is associated with a geographic area. In further embodiments, the allocation of the network slice is associated with an event such as a trade show or conference. In additional embodiments, the allocation of the network slice is associated with a service such as a video content, video game or esports service.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more other blocks.

In some embodiments, artificial intelligence (AI)/machine learning (ML) can be utilized to make some of the decision-making on predictions, such as rankings based on future predicted parameters. For example, for a video session that is to last 2 hours, because it is a movie, predicting that a network condition may no longer satisfy a network condition threshold at a particular time and switching to another network associated with another APN/DNN ahead of time. In other embodiments, if AI/ML is relevant then embodiments can consider which AI/ML models can be trained on such as different services, different device capabilities, different types of users (individuals that interact frequently with a service resulting in more traffic as opposed to individuals that do not), different network conditions, etc.

Portions of some embodiments can be combined with portions of other embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, 205, 210, 215, 220, and 225 and method 230 presented in FIGS. 1, 2A-2G, and 3. For example, virtualized communication network 300 can facilitate in whole or in part a communication device dynamically selecting a network associated with an APN/DNN based on a group of parameters.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
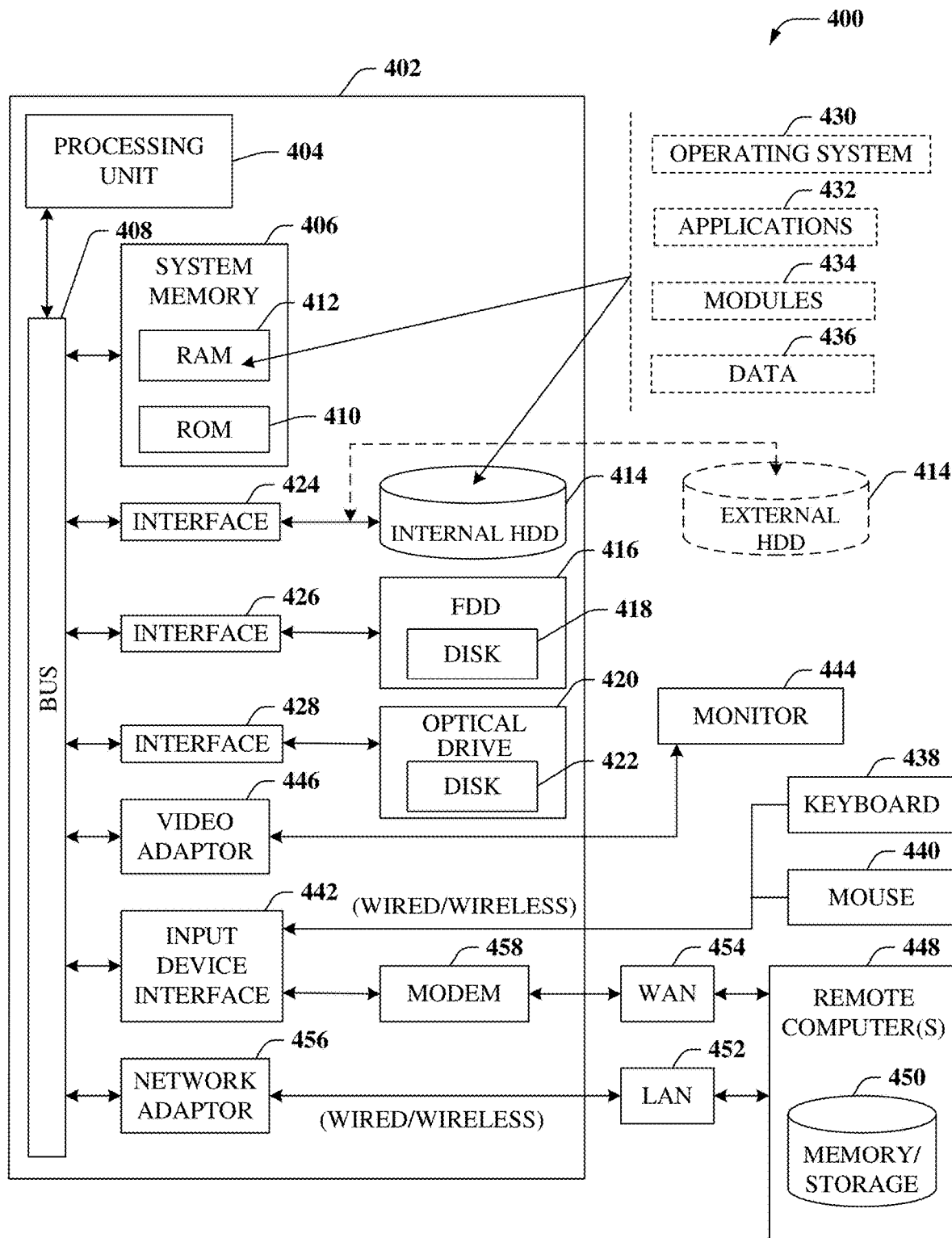
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a communication device dynamically selecting a network associated with an APN/DNN based on a group of parameters. Each of network management device 200a, base station 200c, base station 200d, base station 200e, base station 200f, communication device 200g, communication device 200h, communication device 200i, communication device 200j, communication device 200k, communication device 200l, communication device 200m, base station 205a, base station 210a, communication device 220a, access point 220i, access point 220j, and access point 220k each can comprise a computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
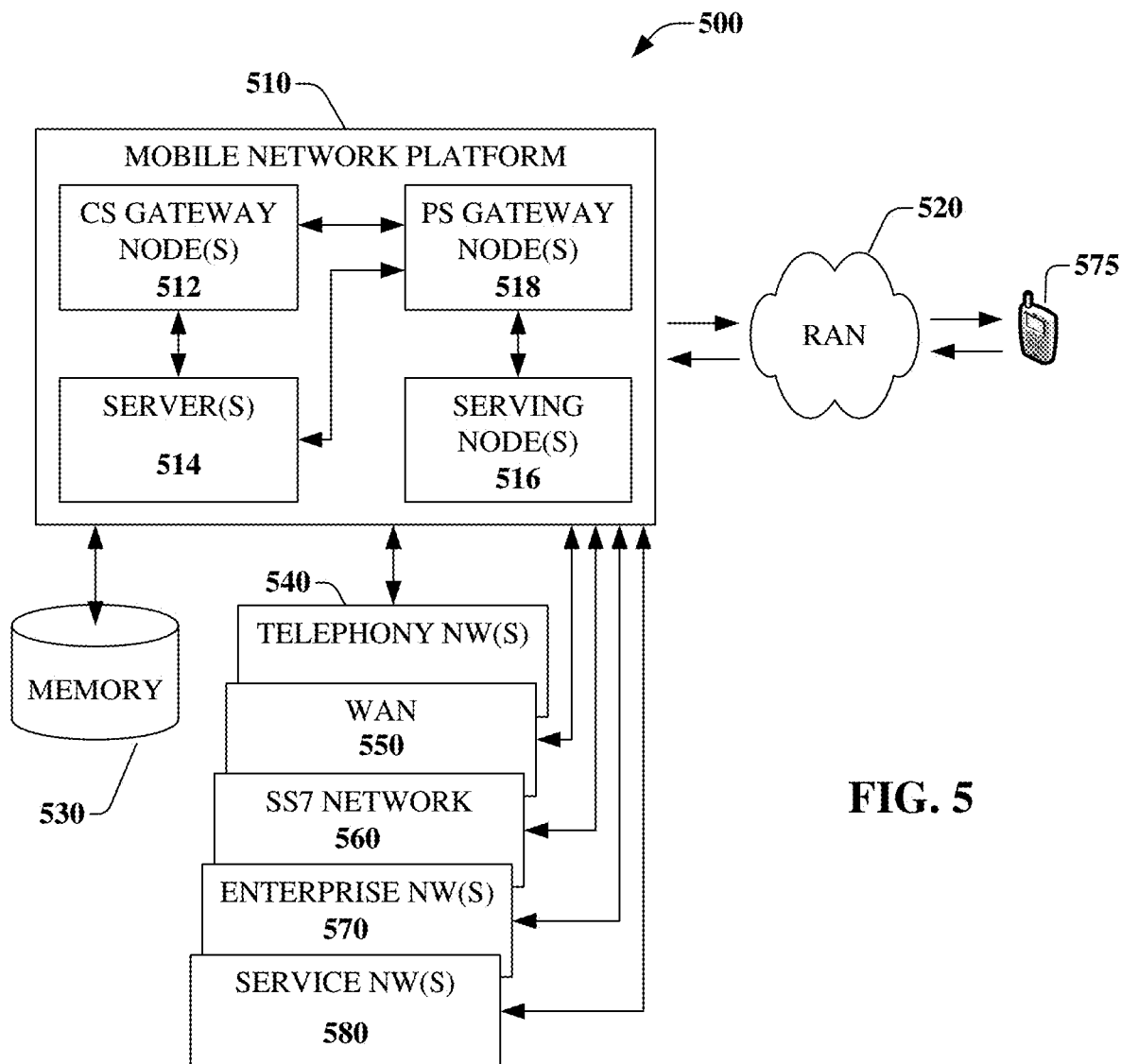
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a communication device dynamically selecting a network associated with an APN/DNN based on a group of parameters.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
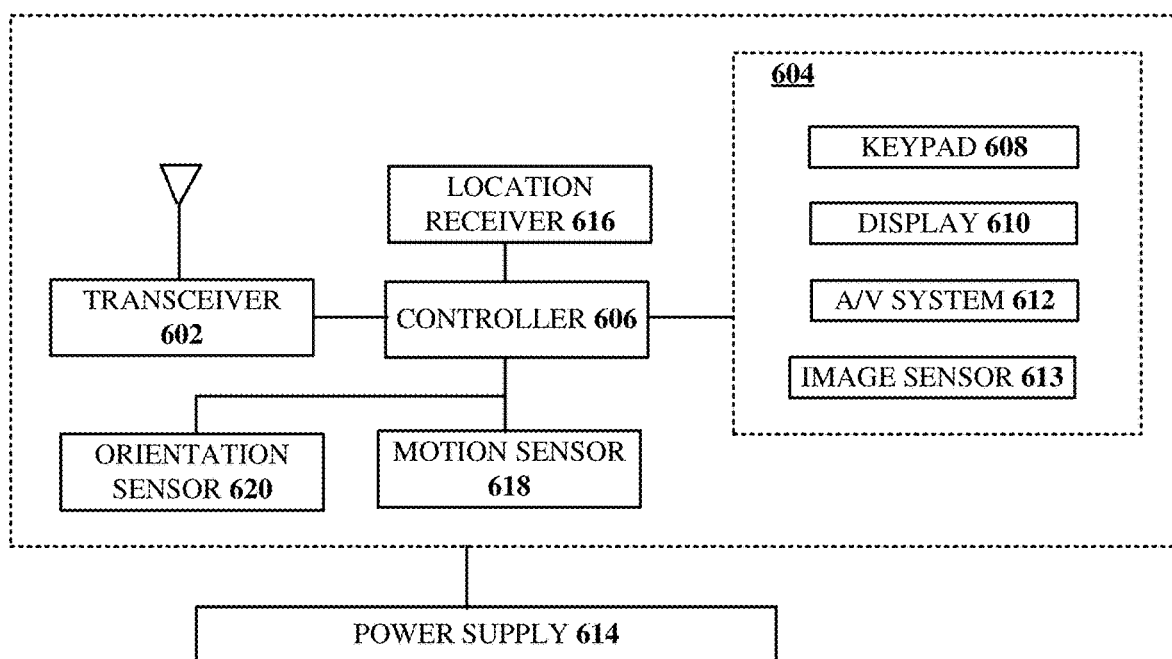
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part a communication device dynamically selecting a network associated with an APN/DNN based on a group of parameters. Each of network management device 200a, base station 200c, base station 200d, base station 200e, base station 200f, communication device 200g, communication device 200h, communication device 200i, communication device 200j, communication device 200k, communication device 200l, communication device 200m, base station 205a, base station 210a, communication device 220a, access point 220i, access point 220j, and access point 220k each can comprise a communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A communication device, comprising:
a processing system including a processor; and
a memory that stores executable instructions that, when executed by the processing system, facilitate performance of operations, the operations comprising:
initiating a data request over a mobile network;
identifying a group of parameters associated with the data request;
selecting a first active network associated with a first active access point name (APN) from a group of networks based on the group of parameters, wherein the mobile network comprises the group of networks;
identifying a first access point for the first active network associated with the first active APN;
establishing a first data communication session associated with the data request to a first group of communication devices communicatively coupled to the first active network via the first access point
determining a network condition associated with the first active network does not satisfy a threshold resulting in a first determination;
selecting a second active network associated with a second active APN from the group of networks based on the group of parameters and the first determination;
identifying a second access point for the second active network associated with the second active APN; and
establishing a second data communication session associated with the data request for a second group of communication devices communicatively coupled to the second active network via the second access point, wherein a portion of the first group of communication devices comprises a portion of the second group of communication devices.

2. The communication device of claim 1, wherein the group of parameters is selected from the group consisting of geographic parameters, IP address parameters, end point parameters, network type parameters, network QoS parameters, network conditions parameters, and network slice parameters.

3. The communication device of claim 1, wherein the operations comprise determining the group of networks based on the group of parameters.

4. The communication device of claim 1, wherein the operations comprise ranking the group of networks based on the group of parameters, wherein the first active network has a highest ranking of the ranking of the group of networks.

5. The communication device of claim 1, wherein the operations comprise identifying the first active network as a default network based on the group of parameters.

6. The communication device of claim 1, wherein the operations comprise:
monitoring a performance metric associated with the second active network during the second data communication session;
determining, based on the performance metric, whether the second active network satisfies a predefined stability threshold;
initiating a fallback to the first active network if the second active network fails to satisfy the predefined stability threshold; and
adjusting the group of parameters based on historical performance data of the second active network to improve a future network selection.

7. The communication device of claim 1, wherein the operations comprise:
identifying an allocation of a network slice for the data request;
identifying a third active network associated with a third active APN associated with the network slice;
identifying a third access point associated with the third active network, wherein the third access point is associated with the third active APN; and
establishing a third data communication session associated with the data request to a third group of communication devices communicatively coupled to the third active network via the third access point, wherein a portion of the first group of communication devices comprises a portion of the third group of communication devices.

8. The communication device of claim 7, wherein the allocation of the network slice is associated with a time period.

9. The communication device of claim 7, wherein the allocation of the network slice is associated with a geographic area.

10. The communication device of claim 7, wherein the allocation of the network slice is associated with an event.

11. The communication device of claim 7, wherein the allocation of the network slice is associated with a service.

12. A non-transitory, machine-readable medium, comprising executable instructions that, when executed by a processing system including a processor, facilitate performance of operations, the operations comprising:
initiating a data request over a mobile network;
identifying a group of parameters associated with the data request;
determining a group of networks based on the group of parameters;
ranking the group of networks based on the group of parameters, wherein the mobile network comprises the group of networks;
selecting a first active network associated with a first active access point name (APN) from the group of networks based on the group of parameters and according to the ranking of the group of network, wherein the first active network has a highest ranking of the ranking of the group of networks;
identifying a first access point for the first active network associated with the first APN;
establishing a first data communication session associated with the data request to a first group of communication devices communicatively coupled to the first active network via the first access point
determining a network condition associated with the first active network does not satisfy a threshold resulting in a first determination;

selecting a second active network associated with a second active APN from the group of networks based on the group of parameters and the first determination;

identifying a second access point for the second active network associated with the second active APN; and establishing a second data communication session associated with the data request for a second group of communication devices communicatively coupled to the second active network via the second access point, wherein a portion of the first group of communication devices comprises a portion of the second group of communication devices.

13. The non-transitory, machine-readable medium of claim 12, wherein the group of parameters is selected from the group consisting of geographic parameters, IP address parameters, end point parameters, network type parameters, network QoS parameters, network conditions parameters, and network slice parameters.

14. The non-transitory, machine-readable medium of claim 12, identifying the first active network as a default network based on the group of parameters.

15. The non-transitory, machine-readable medium of claim 12, wherein the operations comprise:

monitoring a performance metric associated with the second active network during the second data communication session;

determining, based on the performance metric, whether the second active network satisfies a predefined stability threshold;

initiating a fallback to the first active network if the second active network fails to satisfy the predefined stability threshold; and adjusting the group of parameters dynamically based on historical performance data of the second active network to improve future network selection.

16. A method, comprising:

initiating, by a processing system including a processor, a data request over a mobile network;

identifying, by the processing system, a group of parameters associated with the data request;

identifying, by the processing system, an allocation of a network slice for the data request based on the group of parameters;

identifying, by the processing system, a network associated with an access point name (APN) and associated with the network slice, wherein the mobile network comprises the network;

identifying, by the processing system, an access point associated with the network, wherein the access point is associated with the APN;

establishing, by the processing system, a data communication session associated with the data request to a first group of communication devices communicatively coupled to the network via the access point determining, by the processing system, a network condition associated with a first active network does not satisfy a threshold resulting in a first determination;

selecting, by the processing system, a second active network associated with a second active APN from a group of networks based on the group of parameters and the first determination;

identifying, by the processing system, a second access point for the second active network associated with the second active APN; and establishing, by the processing system, a second data communication session associated with the data request for a second group of communication devices communicatively coupled to the second active network via the second access point, wherein a portion of the first group of communication devices comprises a portion of the second group of communication devices.

17. The method of claim 16, wherein the group of parameters is selected from the group consisting of geographic parameters, IP address parameters, end point parameters, network type parameters, network QoS parameters, network conditions parameters, and network slice parameters.

18. The method of claim 16, wherein the allocation of the network slice is associated with a time period.

19. The method of claim 16, wherein the allocation of the network slice is associated with a geographic area.

20. The method of claim 16, wherein the allocation of the network slice is associated with a service.

* * * * *